(12) United States Patent
Fujita et al.

(10) Patent No.: US 8,088,739 B2
(45) Date of Patent: Jan. 3, 2012

(54) METHOD OF FIXING RAIL MOLECULE AND NANO TRANSPORT DEVICE

(75) Inventors: Hiroyuki Fujita, Tokyo (JP); Shoji Takeuchi, Tokyo (JP); Ryuji Yokokawa, Tokyo (JP)

(73) Assignee: The University of Tokyo, Tokyo (JP)

( * ) Notice: Subject to any disclaimer, the term of this patent is extended or adjusted under 35 U.S.C. 154(b) by 1011 days.

(21) Appl. No.: 11/919,640

(22) PCT Filed: Nov. 21, 2005

(86) PCT No.: PCT/JP2005/021334
§ 371 (c)(1),
(2), (4) Date: Oct. 31, 2007

(87) PCT Pub. No.: WO2006/120774
PCT Pub. Date: Nov. 16, 2006

(65) Prior Publication Data
US 2010/0076180 A1    Mar. 25, 2010

(30) Foreign Application Priority Data
May 9, 2005    (JP) .................................. 2005-135703

(51) Int. Cl.
*A61K 38/16* (2006.01)
*C07K 14/00* (2006.01)
(52) U.S. Cl. ....................................... 514/21.2; 977/705
(58) Field of Classification Search .................. None
See application file for complete search history.

(56) References Cited

U.S. PATENT DOCUMENTS
2004/0071607 A1    4/2004    Hiratsuka et al. ............. 422/129
2004/0203071 A1    10/2004    Chase et al. .................. 435/7.1

FOREIGN PATENT DOCUMENTS
JP    2005-58101    3/2005

OTHER PUBLICATIONS

Limberis and Stewart, "Toward kinesin-powered microdevices", Nanotechnology 11: 47-51 (2000).*
Knoblauch and Peters, "Biomimetic actuators: where technology and cell biology merge", Cell. Mol. Life Sci. 61: 2497-2509 (2004).*
Ruji Yokokawa et al, "Hikari o Riyo shita Bishokan Kotei Hoho to Sono Hyoka", Dai 10 Kai Kagaku to Micro Nano System Kenkyukai Koen Yoshishu, Kagaku to Micro Nano System Kenkyukai, Nov. 25, 2004, p. 187.
Ruji Yokokawa et al, "Unidirectional Transport of Kinesin-Coated Beads on Microtubules Oriented in a Microfluidic Devide", Nano Letters, American Chemical Society, Nov. 2004, vol. 4, No. 11, pp. 2265 to 2270.
Ruji Yokokawa et al, "Ultra-smooth glass channels of bioassay with motor proteins", ANALYST, GB, The Royal Society of Chemistry, Sep. 2004, vol. 129, No. 9, pp. 850 to 854.

* cited by examiner

*Primary Examiner* — Anand Desai
(74) *Attorney, Agent, or Firm* — Bacon & Thomas, PLLC

(57) ABSTRACT

An object is to move a rail molecule by means of a biomolecular motor deposited on a base and inactivate the biomolecular motor through irradiation with light having a predetermined wavelength, to thereby readily and reliably fix the rail molecule at a predetermined position, while orienting the rail molecule in a predetermined direction without employment of any reagent. A method for fixing a rail molecule which has polarity and on which a biomolecular motor moves in a direction corresponding to the polarity includes depositing a biomolecular motor on a base; moving a rail molecule by means of the biomolecular motor; and inactivating the biomolecular motor by irradiating the biomolecular motor with light having a predetermined wavelength when the rail molecule reaches a predetermined position, to thereby fix the rail molecule so that it is oriented in a predetermined direction.

3 Claims, 9 Drawing Sheets

(c)

(d)

METHOD OF FIXING RAIL MOLECULE AND NANO TRANSPORT DEVICE

TECHNICAL FIELD

The present invention relates to a method for fixing a rail molecule, and to a nano-transport device.

BACKGROUND ART

Conventionally, in the field of nanotechnology; i.e., a technology encompassing devices measuring several nanometers to several tens of nanometers, studies have been conducted on a technique for producing an engineering device which can convert chemical energy into motion, and which employs a biomolecular motor which is generally found in living organisms. As has been known, kinesin, which is a biomolecular motor, moves on microtubules (i.e., a type of rail molecule) through hydrolysis of ATP (adenosine triphosphate) (see, for example, Non-Patent Documents 1 to 8). In this case, since a microtubule has polarity, and kinesin moves from the minus end of the microtubule toward the plus end thereof, a critical point is to direct the polarity of the microtubule in a predetermined direction; i.e., to orient the microtubule in a predetermined direction, with the activity of the microtubule being maintained.

Non-Patent Document 1: Vale, R. D., Reese, T. S. and Sheetz, M. P., "Identification of a novel force-generating protein, kinesin, involved in microtubule-based motility," Cell, Vol. 42, pp. 39-50 (1985)

Non-Patent Document 2: Howard, J., Hudspeth, A. J. and Vale, R., "Movement of microtubules by single kinesin molecules," Nature, Vol. 342, pp. 154-159 (1989)

Non-Patent Document 3: Vale, R. D., Funatsu, T., Pierce, D. W., Romberg, L., Harada, Y. and Yanagida, T., "Direct observation of single kinesin molecules moving along microtubules," Nature, Vol. 380, pp. 451-453 (1996)

Non-Patent Document 4: Svoboda, K., Schmidt, C., Schnapp, and Block, S., "Direct observation of kinesin stepping by optical trapping interferometry," Nature, Vol. 365, pp. 721-727 (1993)

Non-Patent Document 5: Nishiyama, M., Muto, E., Inoue, Y., Yanagida, T. and Higuchi, H., "Substeps within the 8-nm step of the ATPase cycle of single kinesin molecules," Nat. Cell Biol., Vol. 3, pp. 425-428 (2001)

Non-Patent Document 6: Meyhofer, E. and Howard, J., "The force generated by a single kinesin molecule against an elastic load," Proc. Natl. Acad. Sci. U.S.A., Vol. 92, pp. 574-578 (1995)

Non-Patent Document 7: Coppin, C. M., Pierce, D. W., Hsu, L. and Vale, R. D., "The load dependence of kinesin's mechanical cycle," Proc. Natl. Acad. Sci. U.S.A., Vol. 94, pp. 8539-8544 (1997)

Non-Patent Document 8: Kojima, H., Muto, E., Higuchi, H. and Yanagida, T., "Mechanics of Single Kinesin Molecules Measured by Optical Trapping Nanometry," Biophys. J., Vol. 73, pp. 2012-2022 (1997)

DISCLOSURE OF THE INVENTION

Problems to be Solved by the Invention

However, in the aforementioned conventional techniques, since orientation and fixation of microtubules are performed throughout a device, when a reagent employed for fixation of the microtubules is not thoroughly removed from the device after fixation of the microtubules, kinesin, which is subsequently employed, loses its activity; i.e., kinesin is inactivated. Therefore, repeated reagent exchange is required; i.e., a very intricate process is required.

An object of the present invention is to solve the above-mentioned problems in the conventional techniques and to provide a method for fixing a rail molecule (hereinafter may be referred to as a "rail molecule fixing method") and a nano-transport device, in which a rail molecule is moved by means of a biomolecular motor deposited on a base, and the biomolecular motor is inactivated through irradiation with light having a predetermined wavelength, to thereby readily and reliably fix the rail molecule at a predetermined position so that the rail molecule is oriented in a predetermined direction without employment of any reagent.

Means for Solving the Problems

Accordingly, the present invention provides a method for fixing a rail molecule which has polarity and on which a biomolecular motor moves in a direction corresponding to the polarity, the method comprising depositing a biomolecular motor on a base; moving a rail molecule by means of the biomolecular motor; and inactivating the biomolecular motor by irradiating the biomolecular motor with light having a predetermined wavelength when the rail molecule reaches a predetermined position, to thereby fix the rail molecule so that it is oriented in a predetermined direction.

In another rail molecule fixing method of the present invention, a channel-forming member is attached onto the base, to thereby form, on the base, a channel for orientation (hereinafter may be referred to as an "orientation channel"); the rail molecule is caused to enter the orientation channel through one end of the orientation channel; and the rail molecule is fixed at a predetermined position in the orientation channel.

In yet another rail molecule fixing method of the present invention, the channel-forming member is removed after fixation of the rail molecule.

In yet another rail molecule fixing method of the present invention, the rail molecule is a cytoskeletal filament.

In yet another rail molecule fixing method of the present invention, the predetermined wavelength is 420 to 500 [nm].

In yet another rail molecule fixing method of the present invention, the biomolecular motor is irradiated with light for 60 seconds or more.

In yet another rail molecule fixing method of the present invention, a plurality of rail molecules are fixed so that they are aligned in parallel with one another, and are oriented in the same direction.

In yet another rail molecule fixing method of the present invention, the rail molecules are fixed so as to assume the form of a curve or a bent line.

The present invention also provides a nano-transport device comprising a rail molecule fixed through the aforementioned rail molecule fixing method; and a biomolecular motor which moves on the rail molecule in a direction corresponding to the polarity of the rail molecule, wherein the biomolecular motor transports a substance along the rail molecule.

The present invention also provides a rail molecule for producing a nano transport device, the rail molecule being fixed through the aforementioned rail molecule fixing method.

Effects of the Invention

In the rail molecule fixing method of the present invention for fixing a rail molecule which has polarity and on which a biomolecular motor moves in a direction corresponding to the polarity, a biomolecular motor is deposited on a base; a rail molecule is moved by means of the biomolecular motor; and, when the rail molecule reaches a predetermined position, the biomolecular motor is inactivated through irradiation with light having a predetermined wavelength, to thereby fix the rail molecule so that it is oriented in a predetermined direction.

According to this method, without employment of any reagent, a rail molecule can be readily and reliably fixed at a predetermined position so as to be oriented in a predetermined direction. Therefore, a biomolecular motor can be moved on the rail molecule in the predetermined direction.

In another rail molecule fixing method of the present invention, a channel-forming member is attached onto the base, to thereby form an orientation channel on the base; the rail molecule is caused to enter the orientation channel through one end of the orientation channel; and the rail molecule is fixed at a predetermined position in the orientation channel.

According to this method, since the rail molecule enters the orientation channel so that an end thereof having a predetermined polarity leads, the rail molecule can be fixed so as to be reliably oriented in a predetermined direction. Since the rail molecule can be fixed so as to assume a form corresponding to that of the orientation channel, a biomolecular motor can be moved on the rail molecule along a path of arbitrary form.

The nano-transport device of the present invention comprises a rail molecule fixed through the aforementioned rail molecule fixing method; and a biomolecular motor which moves on the rail molecule in a direction corresponding to the polarity of the rail molecule, wherein the biomolecular motor transports a substance along the rail molecule.

According to this device, a substance can be transported in a predetermined direction.

DESCRIPTION OF REFERENCE NUMERALS

Figure 1:
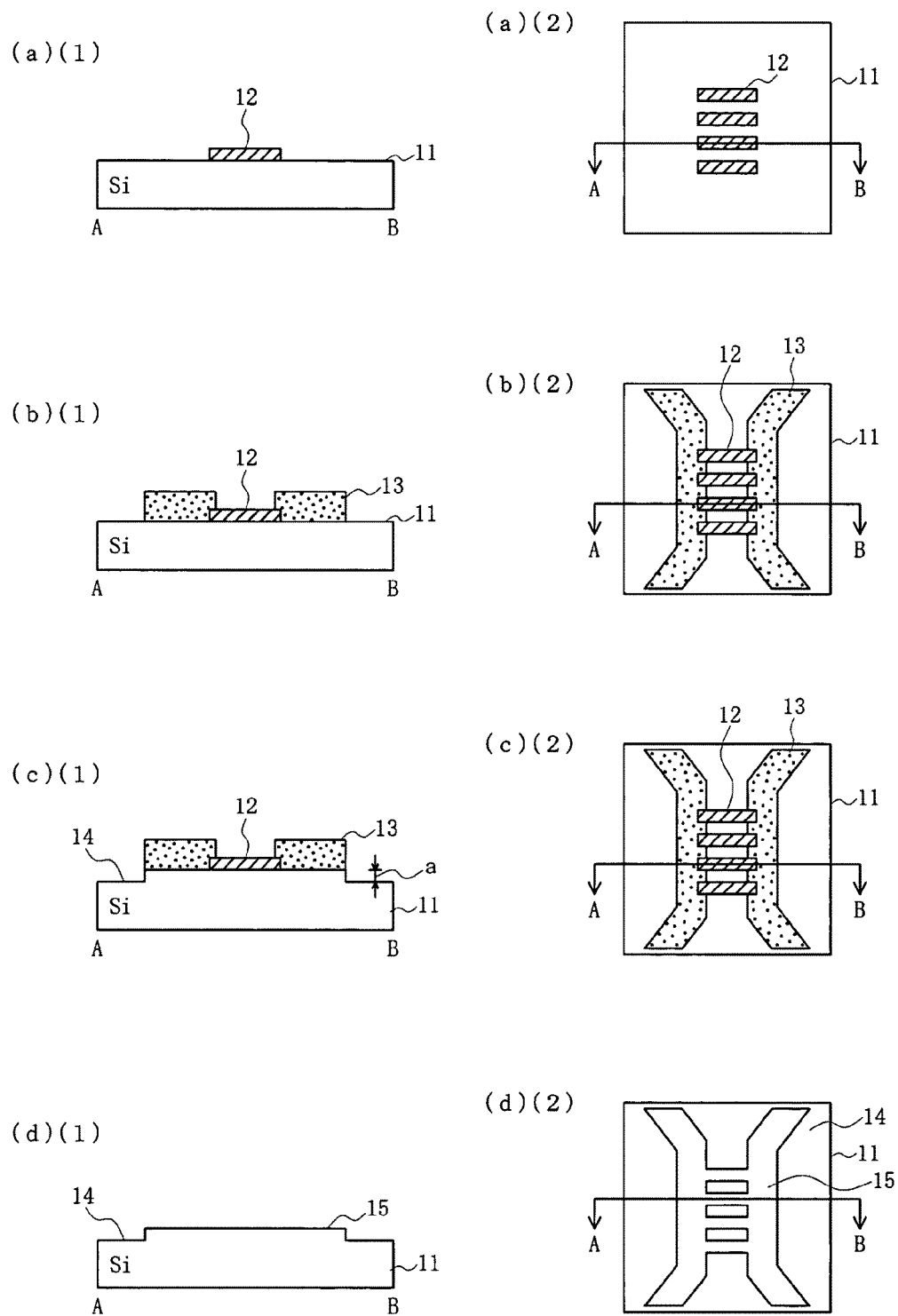
FIG. 1 is a set of views showing a method of producing a mold for forming nano-channels for fixing microtubules in an embodiment of the present invention.

21: PDMS film
22: Glass plate
27: Peripheral convex portion
28: Central convex portion
29: Nano-channel
31: Microtubule
32: Kinesin
36: Kinesin-coated bead

BEST MODES FOR CARRYING OUT THE INVENTION

An embodiment of the present invention will next be described in detail with reference to the drawings.

Figure 2:
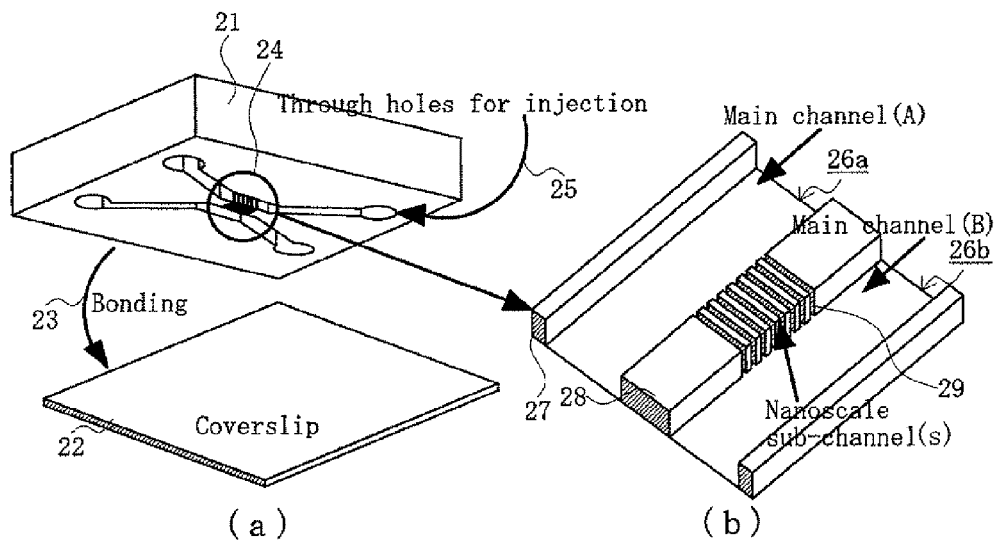
FIG. 2 is a set of views and photographs showings the configuration of nano-channels for fixing microtubules in the embodiment of the present invention.
Figure 2:
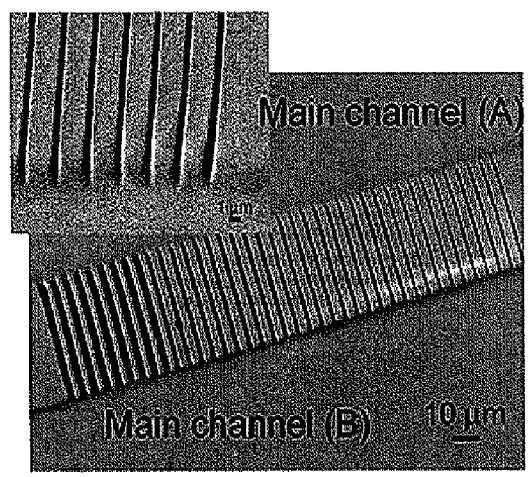
Figure 2:
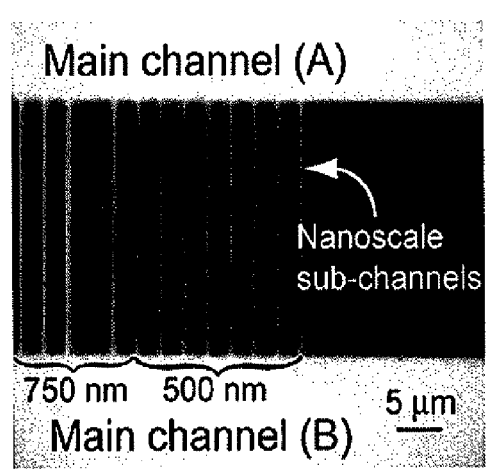

FIG. 1 is a set of views showing a method of producing a mold for forming nano-channels for fixing microtubules in the embodiment of the present invention. FIG. 2 is a set of view and photographs showing the configuration of nano-channels for fixing microtubules in the embodiment of the present invention. In each of FIGS. 1(a) to 1(d), (2) shows a top surface of a substrate, and (1) is a cross-sectional view of (2), as taken along line A-B.

FIG. 1 shows a process of production of a mold for forming orientation channels for fixing therein the below-described microtubules 31 (i.e., rail molecules) so that they are oriented in a predetermined direction; i.e., a mold for forming the below-described nano-channels 29. The present embodiment employs a biomolecular motor which transports organelle, etc. in biological cells. A biomolecular motor, which is also called a "motor protein," binds to a cytoskeletal filament having polarity, and moves along the cytoskeletal filament in a predetermined direction. Several tens of biomolecular motors are present in cells, and the biomolecular motor employed in the present embodiment may be any biomolecular motor; for example, myosin or dynein. Since the present inventors conducted experiments employing, as a biomolecular motor, kinesin 32 as described hereinbelow, the embodiment will be described by taking, as an example, the case where kinesin 32 is employed as a biomolecular motor. As described above, in cells, a cytoskeletal filament serves as a rail molecule for allowing a biomolecular motor to move. The cytoskeletal filament employed may be, for example, an actin filament. Since the present inventors conducted experiments employing microtubules 31 as rail molecules, the embodiment will be described by taking, as an example, the case where microtubules 31 are employed as rail molecules.

For production of a mold for nano-channels 29, firstly, an electron beam resist 12 (e.g., SAL601) was applied to the entire surface of a substrate 11 for the mold, the substrate being made of, for example, Si or $SiO_2$, followed by patterning through electron beam lithography. Through this procedure, a pattern of the electron beam resist 12 shown in FIG. 1(a) was formed on the top surface of the substrate 11. This pattern corresponds to the nano-channels 29 for fixing microtubules 31.

Subsequently, a UV resist 13 (e.g., S1805) was applied to the entire surface of the substrate 11, followed by patterning through photolithography employing UV rays. Through this procedure, a pattern of the UV resist 13 shown in FIG. 1(b) was formed on the top surface of the substrate 11. This pattern corresponds to the below-described access channels 26a and 26b to which the nano-channels 29 are connected.

Subsequently, by using the electron beam resist 12 and the UV resist 13 as masks, a peripheral portion 14 of the top surface of the substrate 11 was etched through deep reactive ion etching (DRIE). Through this procedure, as shown in FIG. 1(c), the peripheral portion 14 was etched to attain a depth a. The depth a is about 4 [μm], which corresponds to the depth of the nano-channels 29 for fixing microtubules 31.

Subsequently, the electron beam resist 12 and the UV resist 13 were removed from the top surface of the substrate 11, to thereby yield a mold having a convex portion 15 as shown in FIG. 1(d). The convex portion 15 corresponds to the nano-channels 29, as well as the below-described access channels 26a and 26b. Subsequently, a prepolymer of PDMS (polydimethylsiloxane) was applied so as to cover the top surface of the substrate 11, and the prepolymer was cured, followed by removal of the thus-cured prepolymer. Through this procedure, a PDMS film 21 shown in FIG. 2(a) was formed.

In the example shown in FIG. 2(a), the nano-channels 29 and the access channels 26a and 26b are formed at an encircled portion 24 of the bottom surface of the PDMS film 21. As indicated by an arrow 23 of FIG. 2(a), the PDMS film 21 was bonded to a glass plate 22 (represented as "Coverslip") serving as a base so that they adhered to each other. The glass plate 22 serves as a cover plate. Through this procedure, a channel-forming member shown in FIG. 2(b) was obtained. Portions indicated by an arrow 25 of FIG. 2(a) are injection holes; i.e., through holes for injecting a buffer containing, for example, saline into the nano-channels 29 and the access channels 26a and 26b.

FIG. 2(b) is an enlarged view of the portion 24. As shown in FIG. 2(b), the access channels 26a and 26b, which are indicated by arrows, are formed between a central convex portion 28 and peripheral convex portions 27 which are located on opposite sides of the central convex portion 28. In FIG. 2(b), the access channels 26a and 26b are respectively represented as "Main channels (A) and (B)."

A plurality of the nano-channels 29 are formed in the central convex portion 28. In FIG. 2(b), the nano-channels 29 are represented as "Nanoscale sub-channel(s)." Each of the nano-channels 29 is connected at both ends to the access channels 26a and 26b, and has the same depth as the access channels 26a and 26b. As described above, the depth is about 4 [μm].

FIG. 2(c) is a micrograph showing the encircled portion 24 of the bottom surface of the PDMS film 21, the micrograph being taken by means of a scanning electron microscope (SEM). The access channels 26a and 26b are observed at the top and bottom of the micrograph, and the nano-channels 29 are observed at the middle of the micrograph. Each of these nano-channels 29 has a length of 50 [μm], a width of 500 to 2,000 [nm], and a height of 4 [μm].

FIG. 2(d) shows nano-channels 29 visualized by use of a fluorescent dye. When the PDMS film 21 is bonded to the glass plate 22 so that they closely adhere to each other, and then a buffer is injected through the injection holes, the buffer is introduced into the nano-channels 29 by capillary action. FIG. 2(d) shows the nano-channels 29 visualized by use of 10 [mM] tetramethylrhodamine (i.e., a fluorescent dye). In FIG. 2(d), narrow nano-channels 29 on the right side have a width of 500 [nm], and wide nano-channels 29 on the left side have a width of 750 [nm].

Next will be described a method for fixing microtubules 31 through irradiation with light having a predetermined wavelength.

Figure 3:
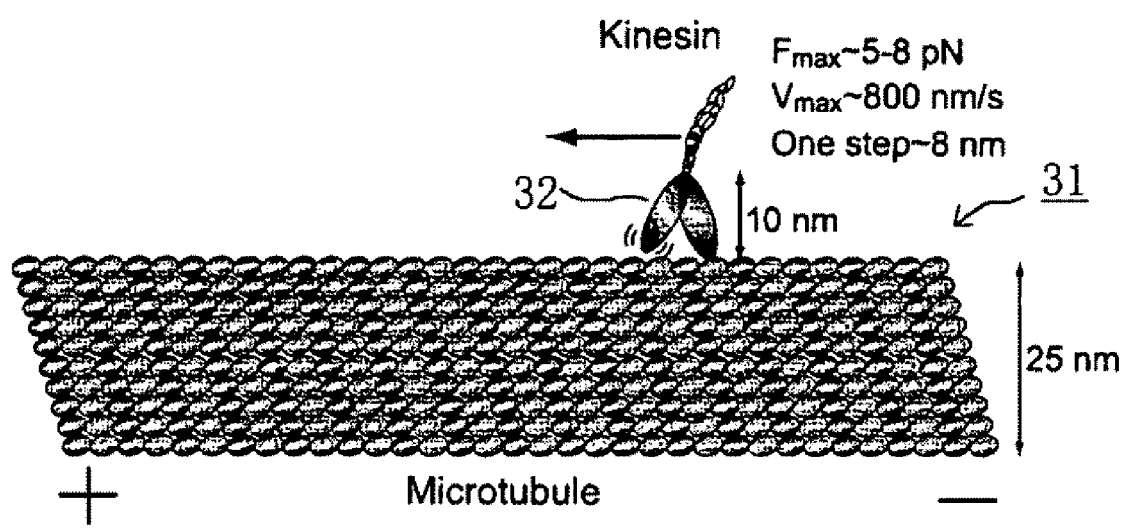
FIG. 3 is a schematic representation showing a microtubule and kinesin employed in the embodiment of the present invention.
Figure 4:
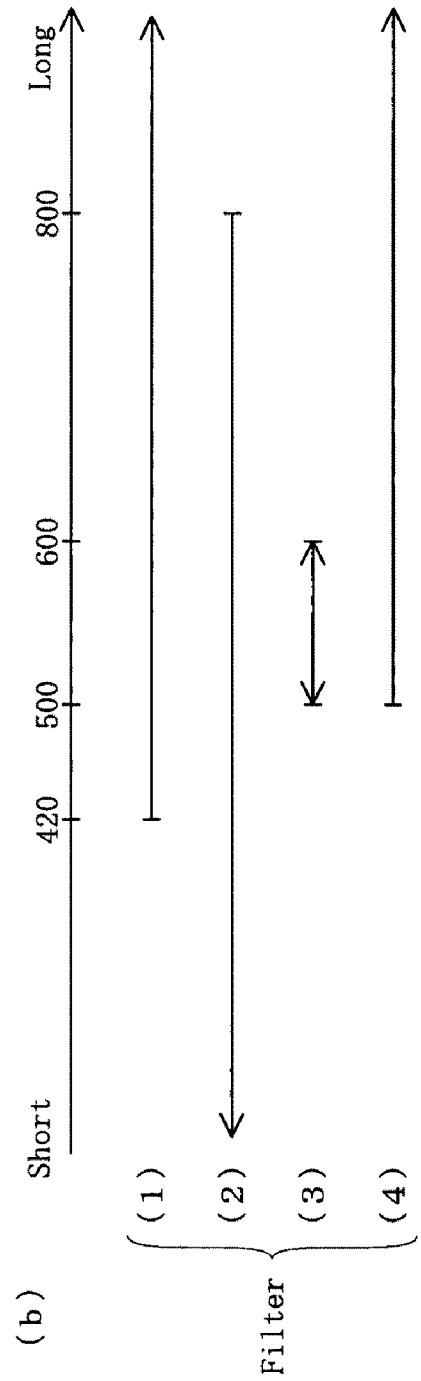
FIG. 4 shows the relation between wavelength of irradiation light and inactivation of kinesin in the embodiment of the present invention.
Figure 5:
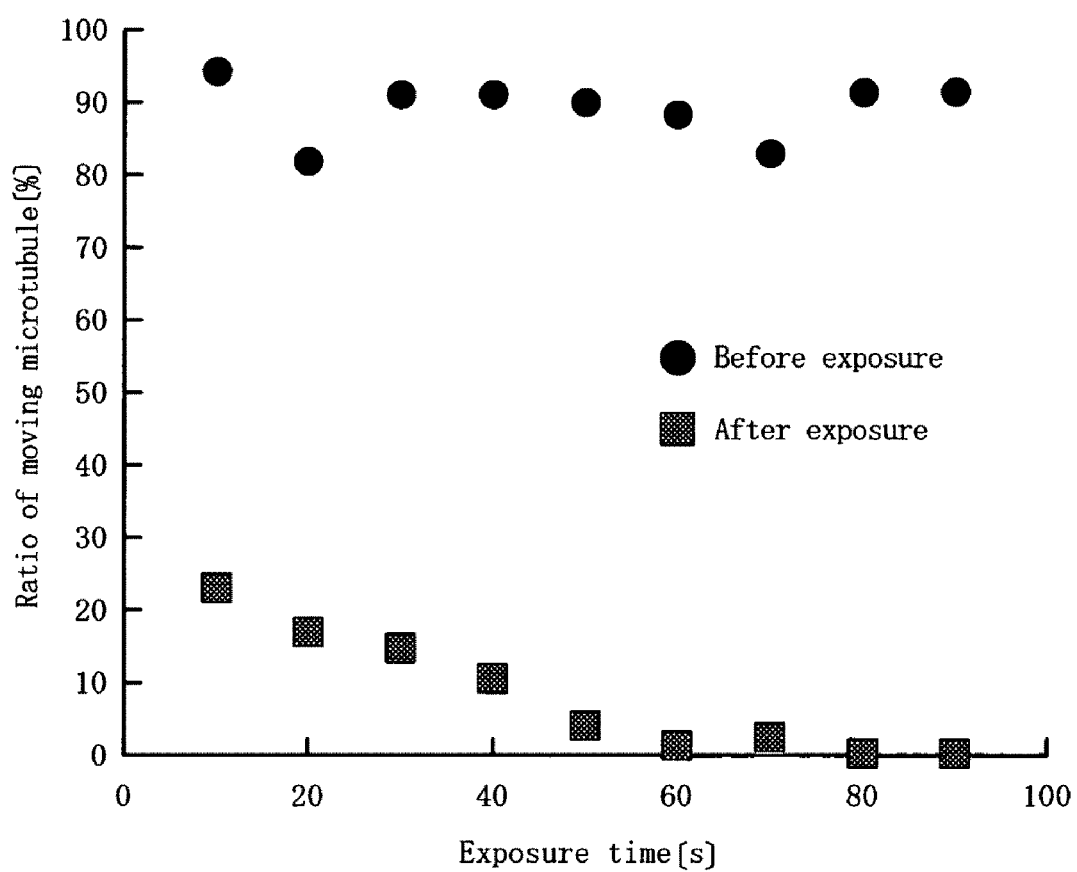
FIG. 5 is a graph showing the relation between light irradiation time and motion of microtubules in the embodiment of the present invention.
Figure 6:
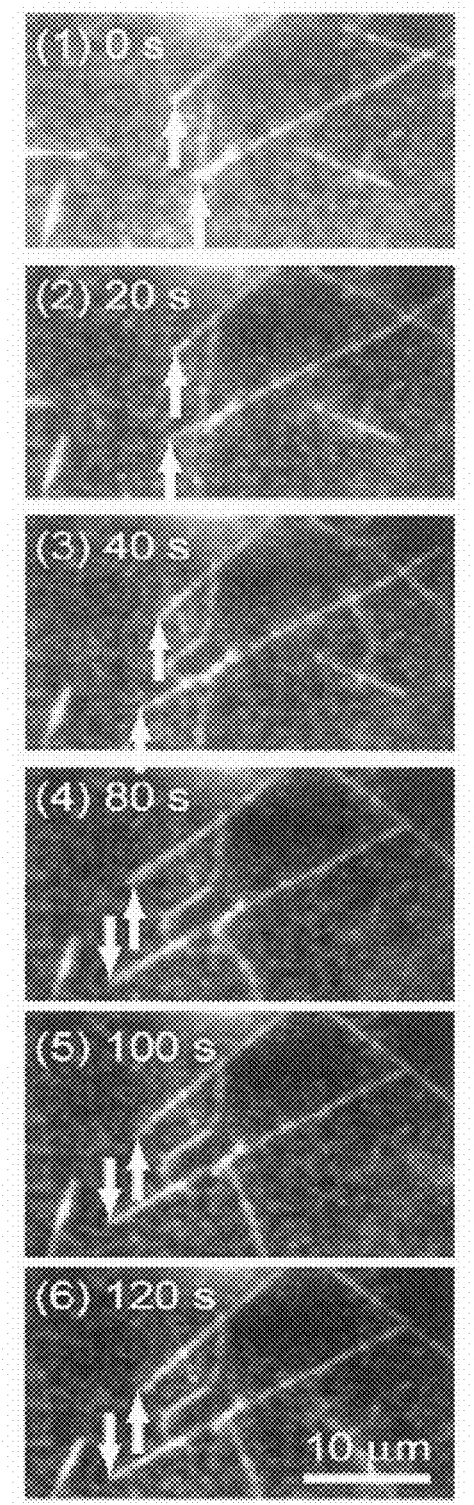
FIG. 6 is a set of photographs showing the relation between light irradiation time and motion of microtubules in the embodiment of the present invention.

FIG. 3 is a schematic representation showing a microtubule and kinesin employed in the embodiment of the present invention; FIG. 4 shows the relation between wavelength of irradiation light and inactivation of kinesin in the embodiment of the present invention; FIG. 5 is a graph showing the relation between light irradiation time and motion of microtubules in the embodiment of the present invention; and FIG. 6 is a set of photographs showing the relation between light irradiation time and motion of microtubules in the embodiment of the present invention.

In FIG. 3, reference numeral 31 denotes a microtubule serving as a rail molecule, and reference numeral 32 denotes kinesin serving as a linear-drive biomolecular motor which moves along the microtubule 31. The microtubule 31 is one of three existing cytoskeletal filaments, and has a cylindrical filamentous structure (diameter: 25 [nm], length: several tens of [μm]) obtained through polymerization of tubulin (i.e., a monomer). Tubulin is a heterodimer obtained through strong noncovalent binding between two globular polypeptides (i.e., α-tubulin and β-tubulin).

The microtubule 31 has polarity; one end thereof (the left end as viewed in FIG. 3) is a plus end, and the other end (the right end as viewed in FIG. 3) is a minus end. Such plus and minus ends are discriminated by the rate of polymerization of tubulin monomers (i.e., subunits) constituting the microtubule 31. Specifically, the end at which the rate of polymerization (extension) is high corresponds to a plus end, and the end at which the rate of polymerization (extension) is low corresponds to a minus end.

Kinesin 32 is a protein molecule having a full length of about 80 [nm] (size of a head portion: 10 [nm]). Kinesin 32, which has two globular head portions and a twisted elongate coil portion, moves step by step on the microtubule 31 through alternate attachment and release of the head portions to and from the microtubule 31 in a repeated manner, as if both hands draw the filaments. In this case, kinesin 32 moves by steps (8 [nm] each) at a maximum speed of about 800 [nm/s]. As shown by the arrow of FIG. 3, kinesin 32 moves on the microtubule 31 from the minus end toward the plus end. Kinesin 32 generates a force of 5 to 8 [pN].

The present embodiment employs a method for fixing microtubules 31 by kinesin 32 through inactivation of kinesin 32 by irradiation with light having a predetermined wavelength. In this method, firstly, numerous molecules of kinesin 32 are fixed onto the surface of a base. When a microtubule 31 is applied thereto, followed by supply of ATP, the microtubule 31 moves by action of kinesin 32 serving as a biomolecular motor. Specifically, kinesin 32 fixed onto the surface of the base moves on the microtubule 31, and thus the microtubule 31 moves above the surface of the base. When the microtubule 31 reaches a predetermined position, kinesin 32 is exposed to light having a predetermined wavelength. Through this procedure, kinesin 32 is inactivated, and motion of kinesin 32 is stopped, with the microtubule 31 being attached to the head portions of kinesin 32. Therefore, the microtubule 31 stops moving. In this case, since the head portions of kinesin 32 remain attached to the microtubule 31, the microtubule 31 is fixed.

The present inventors have found that the aforementioned predetermined wavelength is 420 to 500 [nm] through experiments. Specifically, the present inventors have obtained the results shown in FIG. 4(a) through experiments employing combinations of the following four optical filters (1) to (4):
(1) L42: a UV cut filter which cuts light having a wavelength of 420 [nm] or less;
(2) Robon: an IR cut filter which cuts light having a wavelength of 800 [nm] or more;
(3) IF550: a bandpass filter which transmits light having a wavelength of 500 to 600 [nm]; and
(4) Y50: a filter which cuts light having a wavelength of 500 [nm] or less.

FIG. 4(b) shows the relation between wavelengths of light which passes through the four optical filters (1) to (4). In FIG. 4(b), the horizontal axis corresponds to wavelength.

In the aforementioned experiments, during in vitro gliding assay, kinesin 32 is inactivated through irradiation with light of a mercury lamp which passes through combinations of the optical filters, to thereby stop motion of a microtubule 31. The gliding assay was carried out in a flow cell formed of two glass covers, or formed of a glass cover and a glass slide. In this case, when kinesin 32 is provided in the flow cell so that the tail of kinesin 32 (i.e., the upper portion as viewed in FIG. 3) is fixed to the glass, during hydrolysis of ATP, the heads of kinesin 32 (i.e., the lower portion as viewed in FIG. 3) move the microtubule 31. When motion of kinesin 32 (i.e., a biomolecular motor) is stopped through irradiation with the aforementioned light, motion of the microtubule 31 is stopped.

In the aforementioned experiments, firstly, as shown in the left column of FIG. 4(a), kinesin 32 was exposed to light of a mercury lamp which passes through all the four optical filters (1) to (4), and motion of the microtubule 31 was observed before and after irradiation with light. In this case, kinesin 32 (i.e., a biomolecular motor) continued to move, and did not stop. As is clear from FIG. 4(b), irradiation light which passes through all the four optical filters (1) to (4) has a wavelength of 500 to 600 [nm].

Subsequently, as shown in the middle column of FIG. 4(a), kinesin 32 was exposed to light of a mercury lamp which passes through the two optical filters (1) and (2), and motion of the microtubule 31 was observed before and after irradiation with light. In this case, kinesin 32 (i.e., a biomolecular motor) stopped moving. As is clear from FIG. 4(b), irradiation light which passes through the two optical filters (1) and (2) has a wavelength of 420 to 800 [nm].

Finally, as shown in the right column of FIG. 4(a), kinesin 32 was exposed to light of a mercury lamp which passes through the three optical filters (1), (2), and (4), and motion of the microtubule 31 was observed before and after irradiation with light. In this case, kinesin 32 (i.e., a biomolecular motor) continued to move, and did not stop. As is clear from FIG. 4(b), irradiation light which passes through the three optical filters (1), (2), and (4) has a wavelength of 500 to 800 [nm].

Through these experiments, the present inventors have found that kinesin 32 is inactivated by light having a predetermined wavelength of 420 to 500 [nm] as described above. On the basis of this finding, the present inventors have employed, as light of 420 to 500 [nm] for inactivating kinesin 32, light of a mercury lamp which passes through the two optical filers (1) and (2).

Through further experiments, the present inventors have found that the light irradiation time required for inactivating kinesin 32 is 60 seconds or more. Specifically, in a manner similar to that of the aforementioned experiments for determining the wavelength of light for inactivating kinesin 32, there were carried out experiments in which, during in vitro gliding assay, kinesin 32 was inactivated through irradiation with light (wavelength: 420 to 500 [nm]) of a mercury lamp, to thereby stop motion of microtubules 31. In the experiments, during the gliding assay, time of irradiation with light of a 100 [W] mercury lamp was varied from 10 seconds to 90 seconds, and motion of microtubules 31 was observed before and after irradiation with light.

FIG. 5 shows the results of the experiments for determining the time of irradiation with light of a mercury lamp required for inactivating kinesin 32. FIG. 5 shows the relation between time of irradiation with light of a mercury lamp and motion of microtubules 31, wherein the horizontal axis corresponds to the time of irradiation with light of a mercury lamp, and the vertical axis corresponds to the ratio of moving microtubules 31. In FIG. 5, the symbol "black circle" represents the state before irradiation with light, and the symbol "black square" represents the state after irradiation with light. As is clear from FIG. 5, when the time of irradiation with light of a mercury lamp is 60 seconds or more, motion of all the microtubules 31 is stopped through inactivation of kinesin 32. On the basis of the results, the present inventors have determined to irradiate kinesin 32 with light, which has the above-described wavelength, of a mercury lamp for 60 seconds or more.

By means of a dark-field microscope, motion of microtubules 31 was observed before and after irradiation with light (wavelength: 420 to 500 [nm]) of a mercury lamp. FIG. 6 shows the results of this observation. FIG. 6 is dark-field micrographs showing motion of microtubules 31 before and after irradiation with light during in vitro gliding assay. FIGS. 6(1) to 6(3) correspond to the state before irradiation with light, and show motion of microtubules 31. When kinesin 32 was inactivated through irradiation with light which has the above-described wavelength, of a mercury lamp for 40 seconds, as shown in FIGS. 6(4) to 6(6), microtubules 31 stopped moving and were fixed.

Thus, a microtubule 31 stops moving and is fixed through irradiation with light (wavelength: 420 to 500 [nm]) of a mercury lamp, since kinesin 32 fixed on the glass is inactivated. When the thus-inactivated kinesin 32 is dissociated from the microtubule 31, the microtubule 31 fails to be fixed. However, as has been found, even when kinesin 32 is inactivated through irradiation with light having a wavelength of 420 to 500 [nm], binding between kinesin 32 and the microtubule 31 is maintained, and therefore the microtubule 31 is fixed at a position exposed to light having the aforementioned wavelength.

The method for fixing microtubules through irradiation with light having a wavelength of 420 to 500 [nm] has the following advantage. As shown in FIG. 3, kinesin 32 moves on a microtubule 31 from its minus end toward its plus end, and thus the front end of a microtubule 31 which moves during in vitro gliding assay is a minus end. When a moving microtubule 31 is fixed while being visualized by use of a dark-field micrograph, the microtubule 31 can be fixed such that polarity thereof is clear. That is, the microtubule 31 can be fixed so as to be oriented in a predetermined direction. When a substance is transported by kinesin 32 moving on the microtubule 31 which is fixed such that polarity of the microtubule 31 is clear and the microtubule 31 is oriented in a predetermined direction, the direction in which the substance is transported is clear.

Microtubules 31 may be fixed locally through irradiation with light having a wavelength of 420 to 500 [nm]. For example, as in the case of photolithography, by use of a mask, a specific region is exposed to light of the aforementioned wavelength. Since kinesin 32 is inactivated only at a region exposed to light, only microtubules 31 present in the aforementioned specific region can be fixed.

Thus, when a microtubule 31 (i.e., a rail molecule) reaches a predetermined position, kinesin 32 (i.e., a biomolecular motor) is inactivated through irradiation with light of the aforementioned wavelength, whereby the microtubule 31 can be fixed while being oriented in a predetermined direction. Thus, for example, microtubules 31 can be fixed only in the nano-channels 29 shown in FIG. 2(b) formed of a channel-forming member, such that polarity of the microtubules 31 is clear.

Next will be described a method for fixing microtubules 31 in nano-channels 29.

Figure 7:
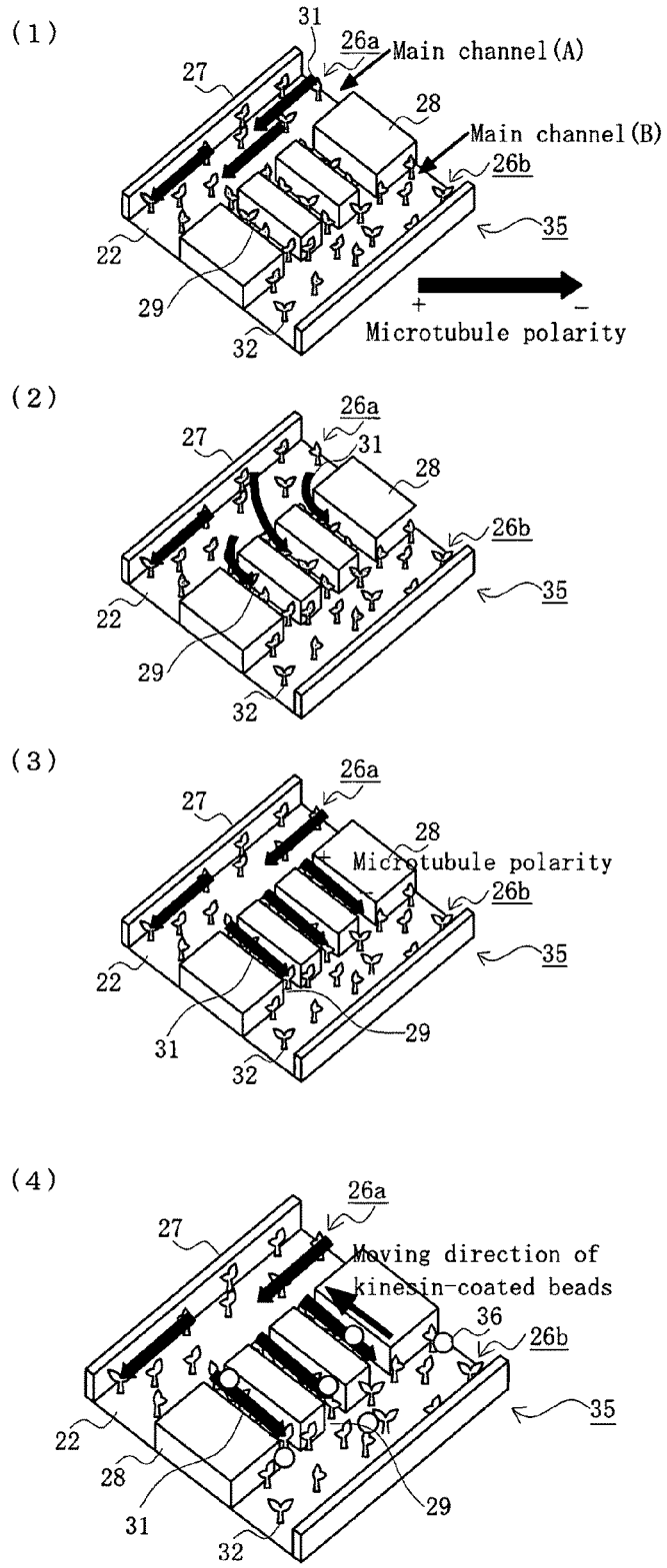
FIG. 7 is a set of views showing a method for fixing microtubules in nano-channels in the embodiment of the present invention.
Figure 8:
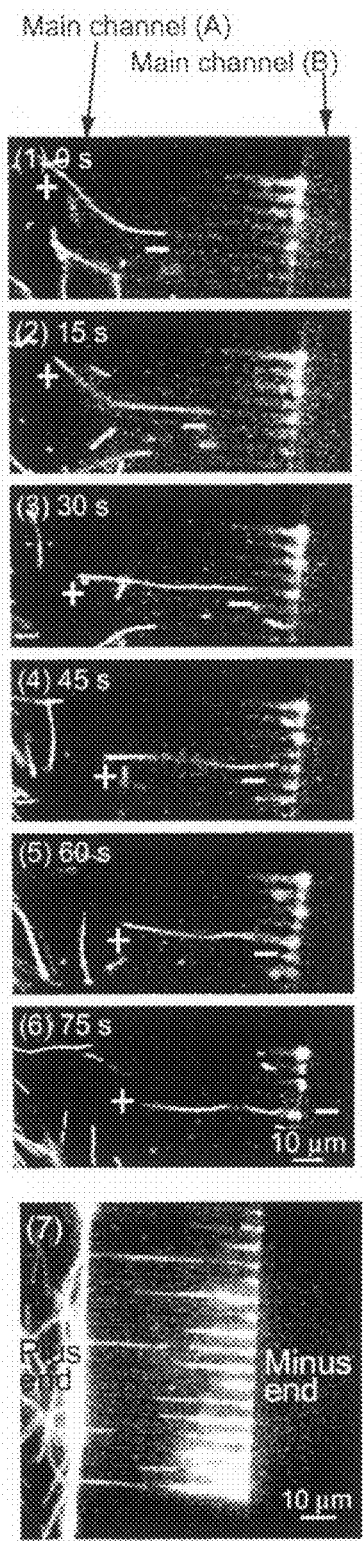
FIG. 8 is a set of photographs showing the state where a microtubule is introduced into a nano-channel in the embodiment of the present invention.
Figure 9:
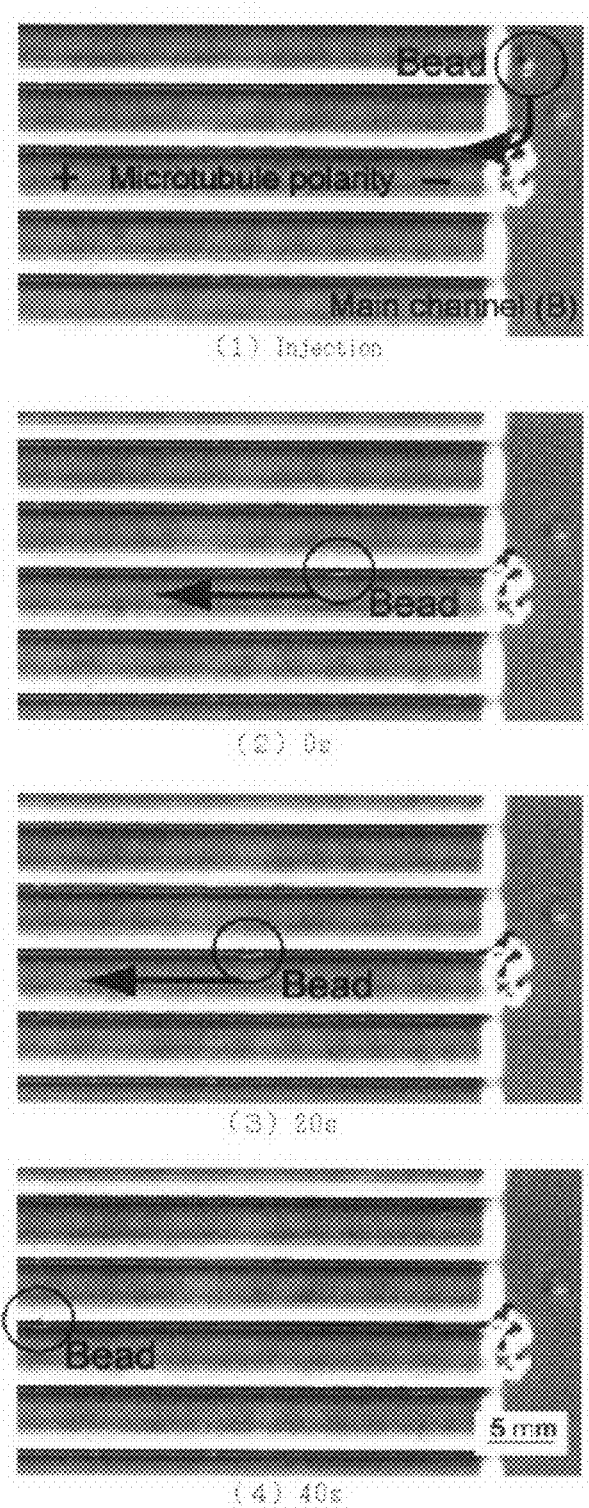
FIG. 9 is a set of photographs showing the state where a bead moves on a microtubule in a nano-channel in the embodiment of the present invention.

FIG. 7 is a set of views showing a method for fixing microtubules in nano-channels in the embodiment of the present invention; FIG. 8 is a set of photographs showing the state where a microtubule is introduced into a nano-channel in the embodiment of the present invention; and FIG. 9 is a set of photographs showing the state where a bead moves on a microtubule in a nano-channel in the embodiment of the present invention.

Now will be described a method for introducing and fixing microtubules 31 in nano-channels 29 of a unit 35 for testing shown in FIG. 7 so that the microtubules 31 are oriented in a predetermined direction. In this case, as shown in FIG. 2(a), the unit 35 is formed through bonding of the PDMS film 21 (i.e., a channel-forming member) to the glass plate 22 (i.e., a base) so that they closely adhere to each other. FIG. 7 shows the state similar to that shown in FIG. 2(b); i.e., the device formed by bonding the glass plate 22 onto the top surface of the channel-forming member is inverted, and the PDMS film 21 is removed so that only the central convex portion 28 and the peripheral convex portions 27 remain.

A plurality of the nano-channels 29 (i.e., orientation channels) are formed in the central convex portion 28, which is a portion of the channel-forming member bonded to the glass plate 22. The access channels 26a and 26b, which are indicated by arrows, are formed between the central convex portion 28 and the peripheral convex portions 27 which are located on opposite sides of the central convex portion 28. In FIG. 7, the access channels 26a and 26b are respectively represented as "Main channels (A) and (B)." The bottom surfaces of the nano-channels 29 are formed of the top surface of the glass plate 22.

The channels of the unit 35; i.e., the access channels 26a and 26b and the nano-channels 29, are charged with a solution containing kinesin 32, and the top surface of the glass plate 22 is coated with molecules of kinesin 32. Subsequently, when microtubules 31 are introduced through the access channel 26a, as shown in FIG. 7(1), the microtubules 31 are trapped by molecules of kinesin 32 in the access channel 26a.

In FIG. 7, the microtubules 31 are represented by thick arrows. The front end of each thick arrow corresponds to a minus end, and the back end thereof corresponds to a plus end. The microtubules 31 have rigidity, and the width of the access channel 26a differs from that of the nano-channels 29. Therefore, as shown in FIG. 7(1), the microtubules 31 do not enter the nano-channels 29, and are deposited on the top surface of the glass plate 22 only within the access channel 26a.

Subsequently, when ATP (concentration: 1 [mM]) is added through the access channel 26a, kinesin 32 moves on microtubules 31 through hydrolysis of ATP. Therefore, microtubules 31 are transported by molecules of kinesin 32 fixed on the top surface of the glass plate 22, and, as shown in FIG. 7(2), the microtubules 31 stochastically enters the nano-channels 29. In this case, when the width of the access channel 26a and the nano-channels 29, the concentration of microtubules 31, and the time of assay are varied, transport of microtubules 31 is optimized so that one microtubule 31 generally enters one nano-channel 29 having a width of, for example, 500 [nm]. As described above, kinesin 32 moves on a microtubule 31 from its minus end toward its plus end, and therefore the microtubule 31 moves in a direction shown by the arrow.

When the microtubules 31 enters the nano-channels 29, through irradiation with light (wavelength: 420 to 500 [nm]) of a mercury lamp, kinesin 32 is inactivated, and the microtubules 31 are fixed. Therefore, as shown in FIG. 7(3), the microtubules 31 are fixed in the nano-channels 29 such that polarity of the microtubules 31 is clear and the microtubules 31 are oriented in a predetermined direction. Through this procedure, there is produced a nano-transport device in which microtubules 31 (i.e., rail molecules) are fixed while being oriented in a predetermined direction.

Subsequently, when, as shown in FIG. 7(4), kinesin-coated beads 36 and ATP (concentration: 1 [mM]) are added through the access channel 26b, kinesin-coated beads 36 which have accessed the microtubules 31 are transported toward the access channel 26a. The kinesin-coated beads 36, which are polystyrene beads (diameter: 320 [nm], Bangs Lab.) coated with kinesin 32, were produced through mixing of the polystyrene beads with kinesin 32, followed by incubation. In this case, since molecules of kinesin 32 fixed on the beads 36 move on the microtubules 31, the kinesin-coated beads 36 (i.e., substance to be transported) are transported from the minus ends of the microtubules 31 toward the plus ends thereof.

As shown in FIG. 8, the present inventors visualized the state where a microtubule 31 enters a nano-channel 29 (width: 750 [nm]) by using a fluorescent microtubule as the microtubule 31. The fluorescent microtubule was obtained by mixing, at an appropriate ratio, tubulin which is labeled with a fluorescent dye (i.e., fluorescent tubulin) and tubulin which is not labeled with a fluorescent dye, followed by polymerization. FIG. 8 is a series of photographs sequentially taken every 15 seconds, which show the state where a microtubule 31 enters a nano-channel 29 during in vitro gliding assay.

After the photograph of FIG. 8(1), which shows the state where the minus end of the microtubule 31 enters a nano-channel 29, had been taken, photographs (FIGS. 8(2) to 8(6)) were sequentially taken every 15 seconds. In some photographs, a portion of the microtubule 31 seems to be broken, which is due to the phenomenon that the microtubule 31 moves out of a focal depth (0.2 [μm]) of an objective lens employed for photographing. This is because molecules of kinesin 32 are deposited not only on the top surface of the glass plate 22, but also on the side walls of the nano-channel 29 of the central convex portion 28 made of PDMS, and thus the microtubule 31 moves on the side walls of the nano-channel 29. FIG. 8(7) shows the state where microtubules 31 enter a plurality of nano-channels 29.

Each of the nano-channels 29, which are shown at the center of the photographs of FIG. 8, has a length of 50 [μm], a width of 500 to 750 [nm], and a height (depth) of 4 [μm]. Each of the access channels 26a and 26b (i.e., Main channels (A) and (B)), which are shown on the left and right sides of the photographs, has a width of 300 [μm] and a height (depth) of 4 [μm].

As shown in FIG. 9, the present inventors fixed a non-fluorescent microtubule 31 in a nano-channel 29 so that it was oriented in a predetermined direction, and then performed a bead assay on the microtubule 31 fixed in the nano-channel 29 by introducing a kinesin-coated bead 36 to the access channel 26b (i.e., Main channel (B)). FIG. 9(1) is a photograph showing the state where the kinesin-coated bead 36 is introduced into the nano-channel 29. FIGS. 9(2) to 9(4) are a series of photographs sequentially taken every 20 seconds, which show the state where the kinesin-coated bead 36 is transported through the nano-channel 29.

In this case, the kinesin-coated bead 36 was deposited at one end (minus end) of the microtubule 31 on the side where the access channel 26b is present, and then moved at a speed of 800 [nm/s] toward the side where the access channel 26a (i.e., Main channel (A)) is present; i.e., the left side as viewed in FIG. 9. That is, the kinesin-coated bead 36 was found to be transported unidirectionally at a speed of 800 [nm/s]. This indicated that the microtubule 31 was fixed in the nano-channel 29 so as to be oriented in a predetermined direction.

As described above, in the present embodiment, a microtubule 31 (i.e., a rail molecule) is moved in a nano-channel 29 (i.e., an orientation channel) formed on the glass plate 22

(serving as a base) coated with kinesin 32 (i.e., a biomolecular motor), and kinesin 32 is inactivated through irradiation with light having a predetermined wavelength (i.e., 420 to 500 [nm]), to thereby fix the microtubule 31 in the nano-channel 29. In this case, since the microtubule 31 enters the nano-channel 29 so that the minus end of the microtubule 31 leads, the microtubule 31 is fixed while being oriented in a predetermined direction. That is, without employment of any reagent, the microtubule 31 can be readily and reliably fixed at a predetermined position while being oriented in a predetermined direction. Therefore, kinesin 32 can be moved on the microtubule 31 in a predetermined direction; i.e., in a direction toward the plus end.

The present embodiment has been described by taking, as an example, the case where the nano-channel 29 has a straight-line form. However, the nano-channel 29 may assume any form; for example, a curve form or a bent-line form. The nano-channel 29 may assume, instead of a two-dimensional curve or bent-line form, a three-dimensional curve or bent-line form. For example, when the glass plate 22 has a curved surface instead of a flat surface, or when the glass plate 22 has projections and depressions on its surface, the nano-channel 29 can assume a three-dimensional curve or bent-line shape. Since the channel-forming member for forming the nano-channel 29 is made of PDMS and exhibits flexibility, even when the glass plate 22 has a curved surface or a surface on which projections and depressions are formed, the channel-forming member can be readily attached onto the glass plate 22. Meanwhile, the nano-channel 29 may have an arbitrary length. Therefore, a substance can be transported by kinesin 32 above the fixed microtubule 31 so that the substance passes through a path which has an arbitrary length and shape and which passes through an arbitrary position.

The central convex portion 28 and the peripheral convex portions 27, which are portions of the channel-forming member for forming the nano-channel 29, may be removed from the glass plate 22 after fixation of the microtubule 31. Irrespective of whether or not the nano-channel 29 is provided, kinesin 32 transports a substance while moving on the fixed microtubule 31, even when the nano-channel 29 is not present, the substance is transported along the microtubule 31.

A nano-transport device for transporting a minute substance (e.g., a kinesin-coated bead 36) can be constituted by a microtubule 31 fixed on the glass plate 22 through the aforementioned method, and kinesin 32 which moves on the microtubule 31 in a direction toward the plus end thereof. In this device, since the microtubule 31 (i.e., a rail molecule) is fixed so as to be oriented in a predetermined direction, a substance can be transported in the predetermined direction by kinesin 32 (i.e., a biomolecular motor), which moves in a direction corresponding to the polarity of the microtubule 31. As described above, the microtubule 31 can be fixed so as to assume an arbitrary length and shape, and to pass through an arbitrary position. Therefore, in the nano-transport device, a substance can be transported via a path which has an arbitrary length and shape and which passes through an arbitrary position. Since the microtubule 31 can be readily and reliably fixed at a predetermined position so as to be oriented in a predetermined direction, the nano-transport device can be readily and reliably produced at low cost.

When a plurality of microtubules 31 (i.e., rail molecules) are fixed so that they are aligned in parallel with one another, and are oriented in the same direction, even a large-size substance can be transported. When a single microtubule 31 is employed, for example, a rectangular parallelepiped substance having a size of about 5 [μm] in length, 5 [μm] in width, and 2 [μm] in thickness can be transported, but a substance having a size greater than the aforementioned size fails to be transported. In contrast, when a plurality of microtubules 31 are fixed so that they are aligned in parallel with one another, and are oriented in the same direction, even a large-size substance can be transported, since a plurality of molecules of kinesin 32 fixed on the substance move on the microtubules 31 in parallel in the same direction. Even in the case where a substance to be transported has a large size, when the substance is immersed in a kinesin solution, a plurality of molecules of kinesin 32 can be fixed on the surface of the substance. Therefore, for example, even a rectangular parallelepiped substance having a size of about 5 [mm] in length, 5 [mm] in width, and 2 [μm] in thickness can be transported.

The present invention is not limited to the above-described embodiments. Numerous modifications and variations of the present invention are possible in light of the spirit of the present invention, and they are not excluded from the scope of the present invention.

INDUSTRIAL APPLICABILITY

The present invention is applicable to a rail molecule fixing method, and to a nano-transport device.

The invention claimed is:

1. A nano-transport device comprising:
   a base,
   a channel-forming member attached onto the base,
   access channels located on opposite sides of the channel-forming member,
   a plurality of orientation channels each of which is formed in the channel-forming member to connect the access channels and has a width of a cytoskeletal filament, the orientation channels extending parallel with one another between the opposite sides of the channel-forming member,
   a plurality of cytoskeletal filaments each of which has polarity and is fixed in one of the orientation channels by a cytoskeletal filament fixing method so that they are aligned in parallel with one another, and are oriented in the same direction, and
   a biomolecular motor which moves on the cytoskeletal filament in a direction corresponding to the polarity of the cytoskeletal filament, wherein:
   the cytoskeletal filament fixing method includes the following steps:
   (i) depositing a biomolecular motor on a base,
   (ii) moving a cytoskeletal filament by means of the biomolecular motor, and
   (iii) inactivating the biomolecular motor by irradiating the biomolecular motor with light having a predetermined wavelength when the cytoskeletal filament reaches a predetermined position, to thereby fix the cytoskeletal filament so that it is oriented in a predetermined direction, and
   the biomolecular motor scan transport a substance along the cytoskeletal filament.

2. The nano-transport device of claim 1, wherein the predetermined wavelength is 420 to 500 nm.

3. The nano-transport device of claim 1, wherein the biomolecular motor is irradiated with light for 60 seconds or more.

\* \* \* \* \*